United States Patent [19]

Thompson

[11] 4,216,111

[45] Aug. 5, 1980

[54] STABLE DISPERSIONS OF FLUORESCENT WHITENING AGENTS OF THE BIS-TRIAZINYLAMINOSTILBENE GROUP IN FREE ACID FORM AND METHOD OF PREPARING SAME

[75] Inventor: John D. Thompson, Upton, England

[73] Assignee: Hickson & Welch Limited, Castleford, England

[21] Appl. No.: 964,614

[22] Filed: Nov. 29, 1978

Related U.S. Application Data

[63] Continuation of Ser. No. 860,904, Dec. 15, 1977, abandoned, which is a continuation of Ser. No. 706,622, Jul. 19, 1976, abandoned.

[30] Foreign Application Priority Data

Jul. 25, 1975 [GB] United Kingdom ............... 31243/75

[51] Int. Cl.$^2$ .................. C07D 403/10; C07D 403/14
[52] U.S. Cl. .......................... 252/301.23; 252/301.21; 542/435; 542/461
[58] Field of Search ............................. 542/461, 435; 252/301.23, 311, 301.21; 8/1 W

[56] References Cited

U.S. PATENT DOCUMENTS

| | | | |
|---|---|---|---|
| 2,846,397 | 8/1958 | Ackermann | 542/461 |
| 3,360,479 | 12/1967 | Hausermann | 252/301.23 |
| 3,511,833 | 5/1970 | Tscharner | 542/461 |
| 3,654,151 | 4/1972 | King | 252/311 |
| 3,669,896 | 6/1972 | Preininger et al. | 252/301.21 |
| 3,740,341 | 6/1973 | Brocklehurst | 542/461 |
| 3,759,900 | 9/1973 | Horstman | 542/461 |
| 3,767,587 | 10/1973 | Claussen et al. | 252/301.23 |
| 3,853,583 | 12/1974 | Langstroth | 252/301.23 |
| 3,962,115 | 6/1976 | Clark et al. | 252/301.23 |
| 4,047,887 | 9/1977 | Kackstadter | 252/301.21 |

OTHER PUBLICATIONS

Sisley, Encyclopedia of Surface Active Agents, 1964, Chem. Pub. Co., N. Y., N Y, p. 42–49.
Weissberger, Techniques of Organic Chemistry, vol. III., 1950, Interscience, p. 158.

*Primary Examiner*—Arthur P. Demers
*Attorney, Agent, or Firm*—Bacon & Thomas

[57] ABSTRACT

Stable aqueous dispersions of fluorescent whitening agents of the bis-triazinylaminostilbene group in substantially free acid form are prepared by deflocculating an aqueous mixture containing said agent in flocculated form.

13 Claims, No Drawings

STABLE DISPERSIONS OF FLUORESCENT WHITENING AGENTS OF THE BIS-TRIAZINYLAMINOSTILBENE GROUP IN FREE ACID FORM AND METHOD OF PREPARING SAME

This is a continuation of application Ser. No. 860,904, filed Dec. 15, 1977, now abandoned which is in turn a continuation of application Ser. No. 706,622, filed July 19, 1976 and now abandoned.

This invention relates to the preparation of stable dispersions of fluorescent whitening agents of the bis-triazinylaminostilbene group.

Fluorescent whitening agents of the triazine type are normally employed as salts in the form of dry powders which are incorporated into treating baths for textiles or paper. This method of usage has the disadvantages that disagreeable dust formation frequently occurs and that the dry powder is difficult to dissolve in low temperature preparations. These difficulties can be overcome by employment of aqueous suspensions, which have the added advantage that they may be readily and accurately metered into the appropriate dosages for the continuous processes that are being increasingly introduced into the textile industry. All these properties are equally beneficial in the preparation of detergents. In particular, the reduction of dusting is a requirement of growing importance in this field of application.

One of the difficulties that has previously been encountered in attempts to prepare stable dispersions of triazine whiteners has been the tendency to sedimentation on standing that these suspensions have exhibited. This has usually been overcome by the introduction of anionic, cationic or non-ionic surfactants as dispersing agents. The use of such additives has necessarily involved further toxicological testing before the finished products can be given clearance for sale to the public, as every new introduction presents a potential new risk to health. We have now found that a stable aqueous suspension (which we believe is largely colloidal) may be prepared without the use of such dispersing agents, by the dispersion of the free acids of various bis-triazinylaminostilbene fluorescent whitening agents.

The invention thus provides a method of preparing an aqueous suspension of a compound of the formula

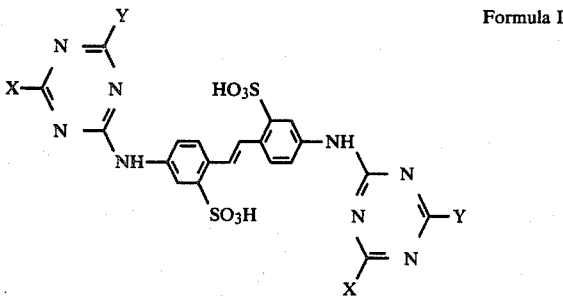

Formula I in which X and Y may be the same or different and each represent an amino or substituted amino group, which method comprises deflocculating an aqueous mixture containing the compound of formula I in flocculated form.

The invention also includes suspensions when prepared by the method of the invention.

The free acids of formula I required as starting materials are conveniently and preferably prepared by acidification of an aqueous suspension of a salt (e.g. a sodium or other alkali metal salt, or a salt with an organic base, e.g. an amine such as a $C_{1-6}$ alkanolamine, e.g. ethanolamine) of an acid of formula I with cold (e.g. 15°–25° C.) mineral acid. Hydrochloric acid may for example be used for this purpose, but other mineral acids such as sulphuric and nitric acid may also be used. The β-crystalline forms of the salts of the acids of formula I are particularly suitable for use in this method of preparing the flocculated starting material. The flocculated material prepared by this method may, and often does, contain residual amounts of the original salt, e.g. up to about 10% by weight. Higher temperatures (e.g. up to 90° C.) may be used in the acidification step, but they are not preferred.

The deflocculation is catalysed or accelerated by the presence of a base. A wide variety of bases may be used, either inorganic or organic, suitable examples being strong alkalis, such as ammonium or alkali metal or alkaline earth metal hydroxides (e.g. lithium, sodium and potassium hydroxides); salts of weak acids, such as disodium hydrogen phosphate, sodium tripolyphosphate, borax, and sodium silicate, carbonate, bicarbonate and acetate; and organic bases particularly organic amines such as mono-, di- and tri-ethanolamine, N-methylethanolamine, isopropanolamine, morpholine, piperidine, ethylamine and butylamine.

Generally, the addition of small amounts of the base immediately raises the pH to about 4.5–5.0 (from an initial value of about 3.5), and the pH eventually rises to about 7.5–8.5 (usually 8.0), at which stage the formation of a stable dispersion can be considered complete. The base is generally used in an amount of up to 0.25 equivalents per mole of the compound of formula I, although in some circumstances larger amounts can be tolerated (e.g. up to 0.5 equivalents per mole when using a strong base such as sodium hydroxide).

The deflocculation of the flocculated starting material may also be catalysed or accelerated by a hydrophilic (water miscible) organic solvent. Examples of such solvents are ketone solvents such as acetone and methyl ethyl ketone; simple alcohols (both monohydric and polyhydric, e.g. containing up to 3 carbon atoms and 3 hydroxy groups) such as methanol, ethanol, isopropanol, and glycerine; ether alcohols such as diethylene glycol and 2-ethoxyethanol; cyclic alcohols such as tetrahydrofurfuryl alcohol; amide solvents such as dimethylformamide; cyclic ethers such as dioxan and tetrahydrofuran; and sulphoxides such as dimethyl sulphoxide. Such solvents may generally be used in an amount of 1–25% by weight of the total mixture, although larger amounts may be used if desired.

Combinations of a base and an organic solvent are particularly effective in accelerating the deflocculation. Conversely, the process is apparently retarded by the presence of neutral electrolytes, such as sodium chloride, even when these are present in quite low proportions.

The reaction mixture is generally agitated during the deflocculation process, and the first stages of the process are characterised by a considerable thickening of the mixture. The difficulty of stirring such stiff mixtures may be overcome by including in the mixture a suspension which has already been deflocculated by the method of the invention. An additional advantage of this technique has been found to be that no extra base or organic solvent need be added to promote the deflocculation.

The deflocculation process is conveniently carried out at room temperature or thereabouts, i.e. 20°–25° C.; higher temperatures, e.g. up to 90° C., may be used if desired, but are not preferred. The time taken to complete the deflocculation to provide the suspension varies according to circumstances and can be as short as one minute or as long as 24 hours. In most cases deflocculation is complete in 2–8 hours.

The resulting suspensions have viscosities that depend upon the manner of their preparation. By a suitable choice of reagents to promote the dispersion, suspensions may be obtained that vary from very stiff thixotropic pastes to mobile liquids. The viscosity of the mixture can also usually be reduced by continuing the stirring and thus the consistency of the product can be raised as desired.

The suspensions generally contain 10–35% by weight of the compound of formula I.

In the compounds of formula I, the amino groups X and Y may for example be of the formula $-NR^1R^2$, where $R^1$ and $R^2$, which may be the same or different, represent hydrogen or a $C_{1-6}$ alkyl (which may be unsubstituted or substituted for example by a hydroxy group), monocyclic aryl (e.g. phenyl), or aralkyl group in which the alkyl portion contains 1–6 carbon atoms, or where $R^1$ and $R^2$ together with the nitrogen atom represent a saturated or unsaturated 5- or 6-heterocyclic group containing 5- or 6-ring members which may contain oxygen, nitrogen or sulphur as a further heteroatom and which may be unsubstituted or substituted, e.g. by a $C_{1-6}$ alkyl group. Typical examples of such amino groups are anilino, morpholino, ethylamino, di(hydroxyethyl)amino, and N-methyl-N-hydroxymethyl amino. Preferably, both X and Y are substituted amino groups.

Triazine fluorescent whitening agents that are particularly suitable for treatment in accordance with the invention are 4,4'-bis(2-anilino-4-morpholino-triazin-6-yl)-aminostilbene-2,2'-disulphonic acid, 4,4'-bis(2-anilino-4-bis(2-hydroxyethyl)aminotriazin-6-yl)aminostilbene-2,2'-disulphonic acid, 4,4'-bis(2-anilino-4-(N-2-hydroxyethyl-N-methyl)aminotriazin-6-yl)aminostilbene-2,2'-disulphonic acid, 4,4'-bis(2-anilino-4-ethylaminotriazin-6-yl)aminostilbene-2,2'-disulphonic acid and 4,4'-bis(2,4-dianilinotriazin-6-yl)aminostilbene-2,2'-disulphonic acid.

The dispersions obtained by the method of the invention have shown great stability in our tests and may be stored for periods in excess of 6 months without appreciable sedimentation. In addition to their greater ease of dissolution and the other advantages over the dry powders already described, in application they show an improved performance in low temperature treatments without the need to subject the material to a grinding process such as is required with dry powders to obtain improved performance.

It will be appreciated from the above that the invention also includes stable suspensions of a compound of formula I in a substantially free acid form in an aqueous alkaline medium.

The following examples illustrate the invention. Parts are parts by weight.

EXAMPLE 1

To 275 parts of filter cake of 4,4'-bis(2-anilino-4-morpholinotriazin-6-yl)-aminostilbene-2,2'-disulphonic acid (32% solids) were added 3.2 parts of borax in 77 parts of water, and the mixture stirred for 8 hours, by which time a white homogeneous thixotropic suspension had been produced. This suspension had an initial Brookfield viscosity at 20° C. of 18,000 cps at 6 r.p.m. and 7,450 cps at 60 r.p.m. It showed no appreciable settling after standing for 6 months.

The filter cake above was prepared by the addition of 600 parts of N hydrochloric acid at 15°–20° C. to a stirred suspension of 250 parts of white crystalline β-form of disodium 4,4'-bis(2-anilino-4-morpholinotriazin-6-yl)-aminostilbene-2,2'-disulphonate in 2000 parts of water. The mixture was stirred for a further 4 hours at 15°–20° C. and then collected by filtration and washed thoroughly with water to give a filter cake containing 32% solid material.

EXAMPLE 2

In an analogous manner to Example 1, 275 parts of a filter cake of 4,4'-bis(2-anilino-4-morpholinotriazin-6-yl)-aminostilbene-2,2'-disulphonic acid were treated with 3.2 parts of sodium silicate in 77 parts of water to afford a stable white homogeneous suspension of the compound.

The suspension so produced is a stiff thixotropic paste of initial Brookfield viscosity at 20° C. of 70,000 cps at 6 r.p.m. and >10,000 cps at 60 r.p.m. which showed no appreciable settling after being allowed to stand for 6 months.

EXAMPLE 3

850 parts of a filter cake of 4,4'-bis(2-anilino-4-morpholinotriazin-6-yl)aminostilbene-2,2'-disulphonic acid were treated in a 'Hidisperser' with 0.85 parts of sodium hydroxide in 100 parts of water. After stirring for 4 hours a mobile white slurry of low viscosity (Brookfield viscosity at 20° C. of 45 cps at 6 r.p.m. and 12 cps at 60 r.p.m.) and 28% w/v solids content was obtained which showed no appreciable settling after standing for 6 months. When this slurry was used in a cold water dyeing test as described below it gave a value of 90% whereas that of the sodium salt starting material was 60%.

Cold Water Dyeing

An amount of slurry was accurately weighed out that is equivalent to 0.06 g of pure product as calculated from the spectrophotometric strength. This was added to a mixture of 40 g of brightener-free detergent granules and 30 g of water, and mixed for 3 minutes. The mixture was dried overnight at 80° C., cooled, all the material passed through a 20 B.S. sieve and then stored in a sealed container.

1.6 g of the incorporated granules were added to 400 g of water in a stainless steel dyepot at 25° C. The mixture was agitated for 1 minute using a high speed mechanical stirrer and pre-wetted 10 g fine cotton pattern added and dyed for 10 minutes with constant slow agitation. The pattern was then removed, squeezed-out, rinsed with water, dried and humidified.

The dye test was repeated at 65° C. using a solution obtained by dissolving 1.6 g of detergent granules completely in water (400 g) by heating to 90° C. and then cooling to 65° C.

The total fluorescence of the dried humidified patterns was read off using a Harrison fluorimeter with a No. 2 filter. The reading of the sample treated at 25° C. is expressed as a percentage of the reading of the sample treated at 65° C. to obtain the values quoted in these Examples.

EXAMPLE 4

Example 3 was repeated using 3.2 parts of triethanolamine instead of sodium hydroxide to yield a stable white slurry of Brookfield viscosity (20° C.) of 90 cps at 6 r.p.m. and 40 cps at 60 r.p.m.

EXAMPLE 5

The addition of 1.6 parts of diethanolamine in 10 parts of water to 300 parts of filter-cake of 4,4'-bis(2-anilino-4-morpholinotriazin-6-yl)-amino-stilbene-2,2'-disulphonic acid afforded ultimately a stable white dispersion having a Brookfield viscosity (20° C.) of 45,000 cps at 6 r.p.m. and 4,400 cps at 60 r.p.m.

EXAMPLE 6

Replacement of the diethanolamine in Example 5 by 0.9 parts of monoethanolamine resulted in the formation of a stiff white paste having a Brookfield viscosity at 20° C. of >100,000 cps at 6 r.p.m. and 8,100 cps at 60 r.p.m.

EXAMPLE 7

The addition of ammonia solution, 10 parts of 1.15% w/v, to 100 parts of a filter-cake of 4,4'-bis(2-anilino-4-morpholinotriazin-6-yl)aminostilbene-2,2'-disulphonic acid afforded after 2 hours a stiff white thixotropic paste which became easily mobile after a further 24 hours. The product had a Cold Water Dyeing value of 90%.

EXAMPLE 8

65 parts of isopropanol were added to 325 parts of a filter cake of 4,4'-bis(2-anilino-4-morpholinotriazin-6-yl)aminostilbene-2,2'-disulphonic acid. After 4½ hours a white thixotropic paste was obtained. It had a Brookfield viscosity at 20° C. of 8,000 cps at 6 r.p.m. and 1,500 cps at 60 r.p.m.

EXAMPLE 9

1.3 parts of disodium hydrogen phosphate dihydrate in 22.5 parts of water were added to a mixture of 115 parts of a filter cake of 4,4'-bis(2-anilino-4-morpholinotriazin-6-yl)aminostilbene-2,2'-disulphonic acid, 35 parts of water and 10 parts of isopropanol to give a white thixotropic paste within 30 minutes.

EXAMPLE 10

1.3 parts of disodium hydrogen phosphate dihydrate in 22.5 parts of water were added to a mixture of 115 parts of a filter cake of 4.4'-bis(2-anilino-4-morpholinotriazin-6-yl)aminostilbene-2,2'-sulphonic acid and 40 parts of isopropanol to give a stiff white paste within one minute.

EXAMPLE 11

Example 10 was repeated, with the 40 parts of isopropanol replaced by 40 parts of diethylene glycol. A stiff white paste was obtained within one minute.

EXAMPLE 12

1.3 parts of disodium hydrogen phosphate dihydrate in 22.5 parts of water were added to a mixture of 115 parts of a filter cake of 4,4'-bis(2-anilino-4-morpholinotriazin-6-yl)aminostilbene-2,2'-disulphonic acid, 70 parts of water and 10 parts of diethylene glycol to give a white mobile dispersion of Brookfield viscosity at 20° C. of 6,100 cps at 6 r.p.m. and 630 cps at 60 r.p.m.

EXAMPLE 13

The addition of 25 parts of acetone to 75 parts of a filter cake of 4,4'-bis(2-anilino-4-morpholinotriazin-6-yl)aminostilbene-2,2'-disulphonic acid resulted in the formation of a stiff white paste within one minute.

EXAMPLE 14

1,400 parts of a filter cake of 4,4'-bis(2-anilino-4-morpholinotriazin-6-yl)aminostilbene-2,2'-disulphonic acid were added gradually to 500 parts of a slurry prepared according to the method of Example 4. A mobile white slurry was obtained with a Brookfield viscosity at 20° C. of 300 cps at 6 r.p.m. and 115 cps at 60 r.p.m. It had a 32% solid content and gave an 85% cold water dyeing value.

EXAMPLE 15

1 part of disodium hydrogen phosphate dihydrate in 15 parts of water was added to a mixture of 50 parts of a filter cake of 4,4'-bis(2-anilino-4-bis(hydroxyethyl)aminotriazin-6-yl)aminostilbene-2,2'-disulphonic acid, prepared in a manner analogous to that of Example 1, and 50 parts of water to give a stiff white paste.

EXAMPLE 16

0.6 parts of borax in 15 parts of water were added to 55 parts of a filter cake of 4,4'-bis(2-anilino-4-bis(hydroxyethyl)aminotriazin-6-yl)aminostilbene-2,2'-disulphonic acid. A white viscous dispersion was obtained.

EXAMPLE 17

1 part of triethanolamine in 5 parts of water was added to a mixture of 150 parts of a filter cake of 4,4'-bis(2-anilino-4-bis(hydroxyethyl)aminotriazin-6-yl)aminostilbene-2,2'-disulphonic acid, 120 parts of water and 33.6 parts of diethylene glycol to give a white mobile dispersion.

EXAMPLE 18

Replacement of the filter cake of Example 15 by the same weight of a cake of 4,4'-bis(2,4-dianilinotriazin-6-yl)aminostilbene-2,2'-disulphonic acid prepared in a analogous manner, gave a stiff yellowish-white paste.

EXAMPLE 19

Replacement of the filter cake of Example 15 by the same weight of a cake of 4,4'-bis(2-anilino-4-ethylaminotriazin-6-yl)aminostilbene-2,2'-disulphonic acid prepared in analogous manner, gave a stiff yellowish paste.

EXAMPLE 20

Replacement of the filter cake of Example 15 by the same weight of a cake of 4,4'-bis(2-anilino-4-N-methyl-N-hydroxyethylaminotriazin-6-yl)aminostilbene-2,2'-disulphonic acid, prepared in analogous manner from the white β-form of the sodium salt, and addition of 1.5 parts of disodium hydrogen phosphate dihydrate instead of 1 part, gave a stiff yellow paste.

I claim:

1. A method of preparing a stable aqueous suspension comprising 10–35% by weight of a compound of the formula

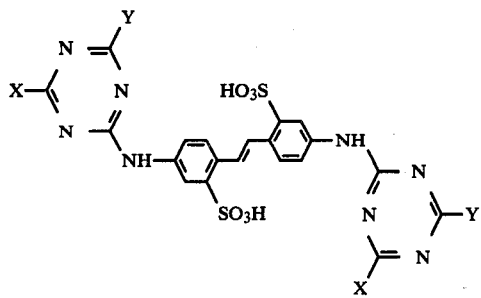

in which X and Y may be the same or different and each represent an amino or substituted amino group, which method consists essentially of
- (A) preparing said compound in flocculated form by acidification of an aqueous suspension of a salt of said compound with a mineral acid;
- (B) forming an aqueous mixture containing the flocculated compound and up to 0.5 equivalents of a base per mole of said compound, and
- (C) agitating said aqueous mixture in the absence of a surfactant to deflocculate it and form said stable suspension.

2. A method as claimed in claim 1 wherein the deflocculation is effected at room temperature.

3. A method as claimed in claim 1 wherein the base is an ammonium, alkali metal or alkaline earth metal hydroxide; a salt of a weak acid; or an organic base.

4. A method as claimed in claim 3 wherein the base is lithium, sodium or potassium hydroxide; disodium hydrogen phosphate, sodium tripolyphosphate, borax, or sodium silicate, carbonate, bicarbonate or acetate; or mono-, di- or tri-ethanolamine, N-methyethanolamine, isopropanolamine, morpholine, piperidine, ethylamine or butylamine.

5. A method as claimed in claim 1 wherein the base is used in an amount of up to 0.25 equivalents per mole of the compound of formula I.

6. A method as claimed in claim 1 wherein the deflocculation is catalysed or accelerated by a water miscible organic solvent.

7. A method as claimed in claim 6 wherein the solvent is a ketone, alcohol, ether alcohol, amide, cyclic ether or sulphoxide solvent.

8. A method as claimed in claim 7 wherein the solvent is acetone, methyl ethyl ketone, methanol, ethanol, isopropanol, glycerine, diethyleneglycol, 2-ethoxyethanol, tetrahydrofurfuryl alcohol, dimethylformamide, dioxan, tetrahydrofuran or dimethyl sulphoxide.

9. A method as claimed in claim 6 wherein the solvent is present in an amount of 1–25% by weight of the mixture.

10. A method as claimed in claim 1 wherein a deflocculated suspension prepared by the method of claim 1 is added to the mixture prior to deflocculation.

11. A method as claimed in claim 1 wherein the groups X and Y are of the formula $-NR^1R^2$, where $R^1$ and $R^2$ are the same or different and are hydrogen or a $C_{1-6}$ alkyl, $C_{1-6}$ hydroxyalkyl, monocyclic aryl or aralkyl group in which the alkyl portion contains 1–6 carbon atoms, or where $R^1$ and $R^2$ together with the nitrogen represent a saturated or unsaturated heterocyclic group containing 5- or 6-ring members, which heterocyclic group may contain oxygen, nitrogen or sulphur as a further heteroatom and which may be substituted by a $C_{1-6}$ alkyl group.

12. A method as claimed in claim 1 wherein the compound of formula I is 4,4'-bis(2-anilino-4-morpholinotriazin-6-yl)-aminostilbene-2,2'-di-sulphonic acid, 4,4'-bis(2-anilino-4-bis(2-hydroxyethyl)aminotriazin-6-yl)aminostilbene-2,2'-disulphonic acid, 4,4'-bis(2-anilino-4-(N-2-hydroxyethyl-N-methyl)aminotriazin-6-yl)-aminostilbene-2,2'-disulphonic acid, 4,4'-bis(2-anilino-4-ethylaminotriazin-6-yl)aminostilbene-2,2'-disulphonic acid or 4,4'-bis(2,4-dianilinotriazin-6-yl)aminostilbene-2,2'-disulphonic acid.

13. A stable dispersion of from 10–35% by weight of a compound as claimed in claim 1 in substantially free acid form in an aqueous alkaline medium free of surfactant.

* * * * *